US007983663B2

(12) United States Patent
Siu

(10) Patent No.: US 7,983,663 B2
(45) Date of Patent: Jul. 19, 2011

(54) SPECIAL PHONE BOOK ENTRIES

(75) Inventor: Ta-yan Siu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1575 days.

(21) Appl. No.: 10/283,875

(22) Filed: Oct. 29, 2002

(65) Prior Publication Data
US 2003/0050054 A1  Mar. 13, 2003

Related U.S. Application Data

(63) Continuation of application No. 09/246,395, filed on Feb. 9, 1999, now abandoned.

(51) Int. Cl.
H04M 3/00 (2006.01)

(52) U.S. Cl. ............ 455/419; 455/418; 455/412.1; 455/412.2; 455/414.1; 455/415

(58) Field of Classification Search .... 455/404.1–404.2, 455/414.2, 414.4, 418–419, 415
See application file for complete search history.

(56) References Cited

U.S. PATENT DOCUMENTS

| 5,684,869 | A  | * | 11/1997 | Palumbo et al. | 379/182 |
| 5,946,634 | A  | * | 8/1999  | Korpela | 455/552.1 |
| 6,026,293 | A  | * | 2/2000  | Osborn | 455/411 |
| 6,073,035 | A  | * | 6/2000  | Witter | 455/574 |
| 6,145,083 | A  | * | 11/2000 | Shaffer et al. | 726/7 |
| 6,195,546 | B1 | * | 2/2001  | Leung et al. | 455/419 |
| 6,331,865 | B1 | * | 12/2001 | Sachs et al. | 715/776 |
| 6,345,180 | B1 | * | 2/2002  | Reichelt | 455/404.1 |
| 6,421,544 | B1 | * | 7/2002  | Sawada | 455/565 |
| 6,484,027 | B1 | * | 11/2002 | Mauney et al. | 455/421 |
| 6,647,267 | B1 | * | 11/2003 | Britt et al. | 455/404.2 |
| 6,775,559 | B1 | * | 8/2004  | Weghorst et al. | 455/558 |
| 7,010,603 | B2 | * | 3/2006  | Martin et al. | 709/227 |
| 7,088,990 | B1 | * | 8/2006  | Isomursu et al. | 455/412.1 |
| 2001/0049236 | A1 | * | 12/2001 | Bechaz et al. | 439/834 |
| 2001/0049263 | A1 | * | 12/2001 | Zhang | 455/67.1 |
| 2005/0159142 | A1 | * | 7/2005  | Giniger et al. | 455/414.3 |

FOREIGN PATENT DOCUMENTS

| EP | 0590500 | 4/1994 |
| EP | 0877531 | 11/1998 |
| WO | 9429992 | 12/1994 |
| WO | 9723104 | 6/1997 |
| WO | 9946911 | 9/1999 |

OTHER PUBLICATIONS

International Search Report—PCT/US00/03300—International Search Authority—Eruopean Patent Office—Aug. 1, 2000.
U.S. Appl. No. 09/246,467, SIU "System and Method for Automatically answering incoming Emergency Calls to a Wireless Phone" filed Feb. 9, 1999.
U.S. Appl. No. 09/246,396 SIU "System and Method for Facilitating Wireless Call Connections in Emergency Situations" filed Feb. 9, 1999.

* cited by examiner

Primary Examiner — Dai A Phuong
(74) Attorney, Agent, or Firm — Kevin T. Cheatham; Nicholas A. Cole

(57) ABSTRACT

When an incoming call is received or an outgoing call is placed, a phone number associated with the call is identified. The phone number is compared to a set of phone book entries corresponding to subscriber-designated phone entries and special phone book entries. If the phone number is identified as corresponding to a special phone book entry, call processing continues according to a field type designated by the selected phone book entry.

40 Claims, 3 Drawing Sheets

| PHONE NUMBER | DISPLAY INFO | TYPE |
|---|---|---|
| *22803 | SERVICE IN PROGRESS | OTASP |
| 911 | EMERGENCY | EMERGENCY |
| 119 | EMERGENCY | EMERGENCY |
| *2 | SERVICE IN PROGRESS | OTASP |
| ... | | |
| 555-1121 | MOM AT WORK | |
| 555-5885 | BETH AT HOME | |
| 555-2337 | BRIAN'S SCHOOL | |

Rows 1–4: SPECIAL PHONEBOOK ENTRIES
Rows 5–7: USER ENTERED PHONEBOOK ENTRIES

FIG. 2

SPECIAL PHONE BOOK ENTRIES

CROSS-REFERENCE TO RELATED APPLICATIONS

This is a continuation of U.S. application Ser. No. 09/246,395, filed Feb. 9, 1999, now abandoned.

BACKGROUND OF THE INVENTION

I. Field of the Invention

This invention relates generally to wireless communication systems. More specifically, the invention relates to call processing in a wireless communication system.

II. Description of the Related Art

Wireless systems are becoming a fundamental mode of telecommunication in modern society. As wireless systems continue to penetrate deeper into the telecommunications market, the demand for user features will only continue to increase. Special user features allow individual carriers to distinguish their services over other wireless carriers. As such, the user features continue to be an important part of a wireless communication system.

FIG. 1 is a block diagram showing a typical modern wireless communication system 10. The system is comprised of a series of base stations 14. A set of remote units 12 communicate with the base stations 14. The remote units 12 communicate with the base stations 14 over a forward link channel 18 and a reverse link channel 20. FIG. 1 shows a variety of types of remote units. For example, FIG. 1 shows a hand-held portable telephone, a vehicle mounted mobile telephone and a fixed location wireless local loop telephone. Such systems offer voice and data services. Other modern communication systems operate over wireless satellite links rather then through terrestrial base stations.

When a subscriber wishes to place a call, typically he enters a telephone number into the keypad of his remote unit 12. A message is sent over the reverse link channel 20 to the base station 14 and a bi-directional communication channel is established between the base station 14 and the remote unit 12. In a similar manner, when a call arrives at the base station 14 for the remote unit 12, the base station 14 sends a message to the remote unit 12 over the forward link channel 18. The remote unit 12 responds to the message and bi-directional communication is established between the remote unit 12 and the base station 14.

In some instances, it is advantageous to provide additional information to the subscriber upon call origination or call receipt at the remote unit 12. In addition, some types of calls should be handled differently by the system 10 than others.

Some prior art systems allow the subscriber to enter phone book entries into the remote unit. Using the phone book entries, the subscriber can identify commonly used telephone numbers and designate them with a corresponding text entry. For example, if a salesman places several calls a day to his home base, he makes a phone book entry which designates his home base. When he wishes to call home base, he enters a telephone number or a set of shortcut keystrokes in order to place a call to the home base. The telephone number is compared with the phone book. The phone book comprises a subscriber-designated text field corresponding to information that will be displayed during the call connection. Typically a liquid crystal display (LCD) shows the text "HOME BASE." Likewise, when an incoming call is received, if caller identification is available, the calling number is compared to the phone book entries. If a corresponding phone book entry is found, the display shows the corresponding text entry. For example, if a regular customer of the salesman calls, the display shows the subscriber designated text "BOB'S FISH EMPORIUM."

These subscriber designated text messages are each associated with standard voice or data telephone connections. In some instances, the subscriber places or receives a special, nonstandard connection. For example, the subscriber can place an emergency call which triggers special call processing procedures. These specials calls are often associated with an industry standard phone number such as 911. However, these standard phone numbers are not universally accepted and can vary from country to country. The carrier needs to remain in control of the calls which are designated as emergency calls because the special call procedures associated with emergency calls consume more resources than standard calls. For this reason, it is not practical to allow the subscriber to designate certain phone numbers to correspond to non-standard connections. In addition, the infrastructure equipment is typically designed to reject connections which are designated as emergency calls unless the phone number corresponds to a known emergency phone number. Thus, if the subscriber attempts to enter his own emergency number, the remote unit may enter an inconsistent state when the designated number is dialed. Because the phone numbers which trigger these nonstandard connections can be customized locally, it is not practical to hard code these numbers into the remote units.

Therefore, there is a need in the industry to develop a special means of call processing for nonstandard connections.

SUMMARY OF THE INVENTION

When an incoming call is received or an outgoing call is placed, a phone number associated with the call is identified. The phone number is compared to a set of phone book entries corresponding to subscriber-designated phone book entries and special phone book entries. If the phone number is identified as corresponding to a special phone book entry, call processing continues according to a field type designated by the selected phone book entry. For example, the call can be an emergency call or an over-the-air service provisioning call. In one embodiment, the selected special phone book entry is stored in the phone book during factory test or setup. In an alternative embodiment, the selected special phone book entry is stored in the phone book during the over-the-air service provisioning call.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout and wherein:

FIG. 2 is a representational diagram showing a set of phone book entries in accordance with the invention.

DETAILED DESCRIPTION OF THE INVENTION

Figure 1:
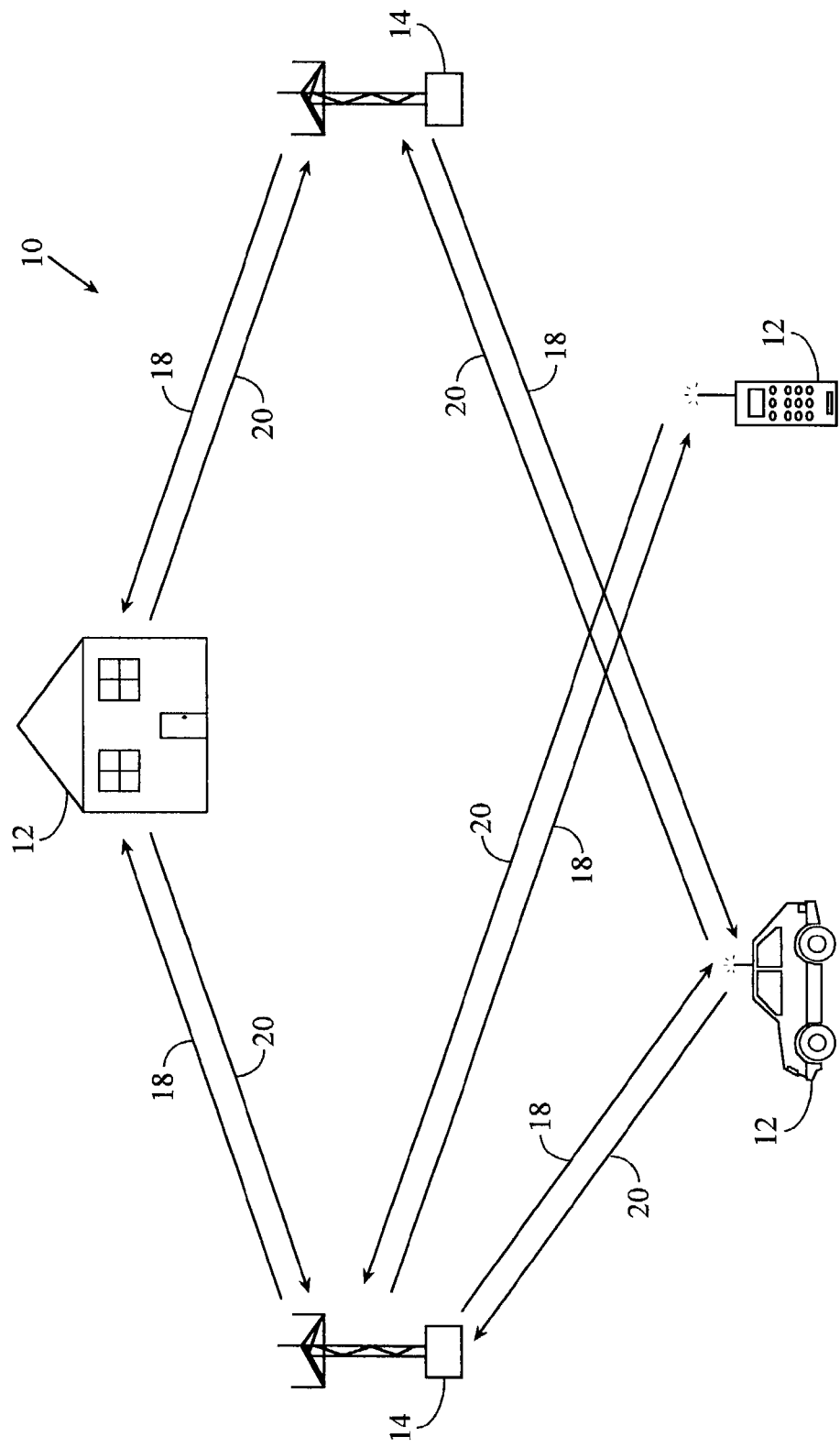
FIG. 1 is a block diagram showing a typical modern wireless communication system.

FIG. 2 is a representational diagram showing a set of phone book entries in accordance with the invention. The phone book itself can be an area of memory designated to store the phone book entries. With reference to FIG. 2, it is seen that in addition to the subscriber-designated phone book entries, the phone book comprises several special phone book entries. These special phone book entries are similar to the subscriber-designated phone book entries with the exception that the special phone book entries each have a corresponding type field. The type field can be used to specify a special type of call processing associated with a particular type of call. For example, there is an industry standard practice which designates the phone number *22803 as an over-the-air service provisioning (OTASP) telephone call. When a call is received from this number, the phone enters a special service processing routine. During an OTASP call, the remote unit responds to the incoming signals as if they were commands rather than passing them indiscriminately to the voice or data output.

Another example of such a call is an emergency call. When a subscriber dials the digits 911, the phone may enter a special emergency call processing routine. For example, in one embodiment, the emergency call processing allows the subscriber to infinitely retry to connect with the network even if no service is available such as in a manner described in co-pending U.S. patent application Ser. No. 09/246,396 entitled "System and Method for Facilitating Wireless Call Connections in Emergency Situations" assigned to the Assignee hereof and incorporated in its entirety herein by this reference. In addition, in one embodiment, the remote unit automatically answers the next telephone call received after originating an emergency call so that the caller may monitor the environment detected by the phone even if the user is incapacitated and unable to answer the call. Such a system is described in U.S. patent application Ser. No. 09/246,467 entitled "System and Method for Automatically Answering Incoming Emergency Calls to a Wireless Phone" assigned to the Assignee hereof and incorporated in its entirety herein by this reference.

In addition to these industry standard phone numbers, each carrier may wish to designate other telephone numbers to prompt special call processing. According to the invention, each of these special phone book entries has a corresponding type which designates any special call processing associated with an incoming or outgoing call to the specified number. For example, a carrier may wish to designate a very short sequence such as *2 to designate a subscriber-initiated OTASP call. In this way, the carrier service is customized and the subscriber is not required to memorize a long series of numbers. Likewise, in some countries, the emergency number is different than the U.S. industry standard 911. A special phone book entry can be used to correlate an emergency number which does not conform with the U.S. industry standard with the emergency call processing routines.

In one embodiment, these special phone book entries are stored in the phone during the manufacturing process such as during factory test or during a field activation process using techniques well known in the art. Alternatively, or in addition, these special phone book entries are stored using well known OTASP techniques which are performed while the remote unit is deployed in the field. In yet another embodiment, these special phone book entries are stored using product support tools in the service providers service center. It is important that the system subscriber does not have the capability to enter, remove or modify any of the special phone book entries. For example, it would not be advantageous to allow a subscriber to enter a private telephone number designated as an emergency number.

Figure 3:
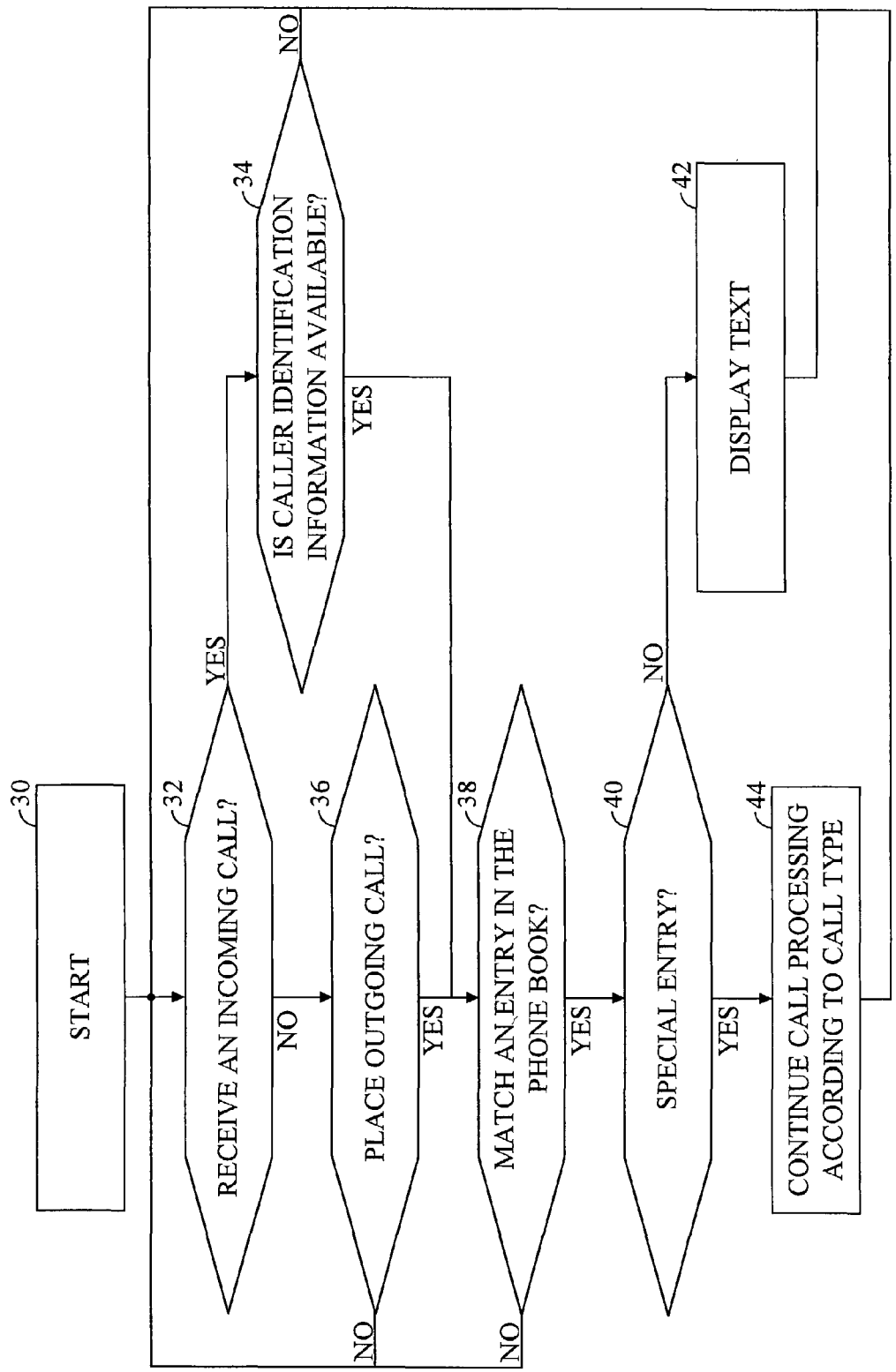
FIG. 3 is a flow chart showing call processing in accordance with the invention.

Operation of the system in accordance with one embodiment of the invention can be described with reference to FIG. 3. In particular, flow begins in start block 30. Block 32 determines whether an incoming call has been received. If a call has been received, flow proceeds to block 34 which determines whether caller identification information is available. If so, flow continues on to block 38. If not, flow continues back to block 32.

If no incoming call is received in block 32, flow moves to block 36 which determines whether an outgoing call has been placed. If not, flow continues back to block 32. If an outgoing call has been placed, flow continues to block 38.

Upon entering block 38, the identity of an outgoing or incoming call is known. Block 38 determines whether the phone book contains a corresponding entry. If not, flow continues back to block 32.

If a corresponding entry is available in the phone book, flow continues to block 40. Block 40 determines whether the entry is a special entry or a subscriber-designated entry. If the entry is a special entry, flow continues to block 44 where call processing according to the call type, is executed. If the entry does not correspond to a special entry, flow continues to block 42 where standard phone operation is executed. For example, the corresponding text in the phone book is displayed in the LCD of the remote unit. After execution of blocks 42 or 44, flow continues back to block 32.

Upon examination of the above description, a myriad of alternative embodiments will be readily discernible by those skilled in the art. For example, the type field could designate any manner of connection type besides OTASP or emergency. For example, certain network modem pools require a phone connection placed using analog modulation techniques such as frequency modulation (FM) techniques rather than digital modulation techniques such as code division multiple access (CDMA) or time division multiple access (TDMA) techniques. These modem pool numbers can be added as special phone book entries so that when these numbers are dialed, the phone automatically enters analog mode operation before beginning call origination procedures.

In another embodiment, certain numbers can be designated as priority numbers. When a subscriber locks his phone, a special code must be entered into the phone before the phone will place a call. However certain phones, such as emergency numbers are associated with special routines which over-ride the locking mechanism. For example, emergency routines typically override the locking mechanism and allow a call to be place even when the phone is locked. A special phone book entries can be used to designate other priority numbers which are associated with special routines which override the locking mechanism. For example, a carrier my designate a network operator phone number which is associated with a routine that overrides the locking mechanism so that a subscriber who has forgotten his unlocking code can place a call to his service provider to unlock the phone.

Typically, the invention is implemented in software running on a digital signal processor (DSP) or is embodied in hardware such as a field programmable gate array (FPGA) or in an application specific integrated circuit (ASIC) or in memory controlled by a microprocessor. The invention may be embodied in a series of processes which carryout the steps shown in FIG. 3.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of automated programming for a mobile station, comprising:

creating, in a memory of the mobile station, an electronic phone book comprising at least one carrier-designated special phone book entry and a subscriber-designated phone book entry, each carrier-designated special phone book entry comprising a number field and a type field specifying a type of call processing to apply to any incoming or outgoing call corresponding to the carrier-designated special phone book entry, the subscriber-designated phone book entry comprising a number field and an information field;

receiving a request to process either an incoming telephone call or an outgoing telephone call, the incoming or outgoing telephone call having a telephone number associated with the received request identifying a second station;

determining if the telephone number associated with the received request corresponds to numbers stored in the number field of at least one carrier-designated special phone book entry;

processing the received request, based on determining that the telephone number associated with the received request corresponds to numbers stored in at least one number field of the carrier-designated special phone book entry, by substituting a standard telephone call processing routine used for processing telephone numbers associated with subscriber-designated phone book entries with a special telephone call processing routine selected from a plurality of special telephone call processing routines based on the type field associated with the carrier-designated special phone book entry, wherein:

each carrier-designated special phone book entry is programmed into the electronic phone book based on parameters associated with a received call that correspond to a type of call processing associated with a carrier-designated special phone book entry, and each carrier-designated special phone book entry is stored in the electronic phone book such that it is not accessible to a subscriber, and such that the subscriber does not have the capability to enter, remove or modify any of the carrier-designated special phone book entries.

2. The method of claim 1, wherein the parameters associated with a received call include a phone number and a call type.

3. The method of claim 2, wherein the call type is associated with a special operation of the mobile station.

4. The method of claim 3, wherein the call type is an emergency call.

5. The method of claim 4, wherein the call type corresponding to the emergency call corresponds to a processing routine that processes the emergency call even when the mobile station is locked.

6. The method of claim 1, wherein the parameters are changed as the configuration of the wireless network changes.

7. The method of claim 1, wherein the parameters vary based on the operating region of the mobile station.

8. The method of claim 1, wherein the receiving of the parameters and the programming are performed during over-the-air service provisioning.

9. The method of claim 1, wherein the receiving of the parameters and the programming are performed during field testing.

10. The method of claim 1, wherein the receiving of the parameters and the programming are performed while the mobile station is connected to an external device.

11. The method of claim 10, wherein the external device is a product support tool.

12. The method of claim 1, wherein the receiving of the parameters and the programming are implemented in software.

13. The method of claim 1, further comprising:

receiving an input to lock a locking mechanism on the mobile station, wherein the locking mechanism is operable to lock or unlock access to the mobile station;

receiving a new call corresponding to the at least one carrier-designated special phone book entry and having the type of call processing comprising automatically unlocking the mobile station; and unlocking the locking mechanism based on receiving the new call.

14. The method of claim 1, wherein the type of call processing comprises correlating a received emergency number in a first standard to an emergency call processing routine in a second standard.

15. The method of claim 1, wherein the at least one carrier-designated special phone book entry comprises a modem pool number and the type of call processing comprises a routine that establishes a connection using an analog modulation technique.

16. The method of claim 1, wherein the at least one carrier-designated special phone book entry comprises a network operator number and the type of call processing comprises a routine that overrides a locking mechanism and calls a network operator.

17. A mobile station configured to be programmed, comprising:

means for creating, in a memory of the mobile station, an electronic phone book comprising at least one carrier-designated special phone book entry and a subscriber-designated phone book entry, each carrier-designated special phone book entry comprising a number field and a type field specifying a type of call processing to apply to any incoming or outgoing call corresponding to the special phone book entry, the subscriber-designated phone book entry comprising a number field and an information field;

means for receiving a request to process either an incoming telephone call or an outgoing telephone call, the incoming or outgoing telephone call having a telephone number associated with the received request and identifying a second station;

means for determining if the telephone number associated with the received request corresponds to numbers stored in the number field of at least one carrier-designated special phone book entry;

means for processing the received request, based on determining that the telephone number associated with the received request corresponds to numbers stored in at least one number field of the carrier-designated special phone book entry, by substituting a standard telephone call processing routine used for processing telephone numbers associated with subscriber-designated phone book entries with a special telephone call processing routine selected from a plurality of special telephone call processing routines based on the type field associated with the carrier-designated special phone book entry, wherein:

each carrier-designated special phone book entry is programmed into the electronic phone book based on parameters associated with a received call that correspond to a type of call processing associated with a carrier-designated special phone book entry, and each carrier-designated special phone book entry is stored in the electronic phone book such that it is not accessible to a subscriber, and such that the subscriber does not have the capability to enter, remove or modify any of the carrier-designated special phone book entries.

18. The mobile station of claim 17, wherein the special telephone call processing routine selected from a plurality of special telephone call processing routines is an incoming over-the-air service provisioning call processing routine.

19. The mobile station of claim 17, wherein the special telephone call processing routine selected from a plurality of special telephone call processing routines is an outgoing over-the-air service provisioning call processing routine.

20. The mobile station of claim 17, wherein a new carrier-designated special phone book entry is stored during over-the-air service provisioning.

21. The mobile station of claim 17, further comprising:
receiving an input to lock a locking mechanism on the mobile station, wherein the locking mechanism is operable to lock or unlock access to the mobile station;
receiving a new call corresponding to the at least one carrier-designated special phone book entry and having the type of call processing comprising automatically unlocking the mobile station; and
unlocking the locking mechanism based on receiving the new call.

22. The mobile station of claim 17, wherein the type of call processing comprises correlating a received emergency number in a first standard to an emergency call processing routine in a second standard.

23. The mobile station of claim 17, wherein the at least one carrier-designated special phone book entry comprises a modem pool number and the type of call processing comprises a routine that establishes a connection using an analog modulation technique.

24. The mobile station of claim 17, wherein the at least one carrier-designated special phone book entry comprises a network operator number and the type of call processing comprises a routine that overrides a locking mechanism and calls a network operator.

25. A mobile station configured to be programmed, comprising:
a display;
a memory; and
a processor coupled to the memory and to the display, wherein the processor is configured with processor-executable instructions to perform operations comprising:
creating, in the memory, an electronic phone book comprising at least one carrier-designated special phone book entry and a subscriber-designated phone book entry, each carrier-designated special phone book entry comprising a number field and a type field specifying a type of call processing to apply to any incoming or outgoing call corresponding to the carrier-designated special phone book entry, the subscriber-designated phone book entry comprising a number field and an information field;
receiving a request to process either an incoming telephone call or an outgoing telephone call, the incoming or outgoing telephone call having a telephone number associated with the received request and identifying a second station;
determining if the telephone number associated with the received request corresponds to numbers stored in the number field of at least one carrier-designated special phone book entry;
processing the received request, based on determining that the telephone number associated with the received request corresponds to numbers stored in at least one number field of the carrier-designated special phone book entry, by substituting a standard telephone call processing routine used for processing telephone numbers associated with subscriber-designated phone book entries with a special telephone call processing routine selected from a plurality of special telephone call processing routines based on the type field associated with the carrier-designated special phone book entry, wherein:
each carrier-designated special phone book entry can be programmed into the electronic phone book based on parameters associated with a received call that correspond to a type of call processing associated with a carrier-designated special phone book entry, and
the subscriber does not have the capability to enter, remove or modify any of the carrier-designated special phone book entries.

26. The mobile station of claim 25, further comprising:
a locking mechanism configured to lock or unlock access to the mobile station,
wherein when a new call is received corresponding to the at least one carrier-designated special phone book entry and having the type of call processing comprising automatically unlocking the mobile station, the locking mechanism is configured to unlock based on receiving the new call.

27. The mobile station of claim 25, wherein the special telephone call processing routine selected from a plurality of special telephone call processing routines is an incoming over-the-air service provisioning call.

28. The mobile station of claim 25, wherein the special telephone call processing routine selected from a plurality of special telephone call processing routines is an outgoing over-the-air service provisioning call.

29. The mobile station of claim 25, wherein a new carrier-designated special phone book entry is stored during over-the-air service provisioning.

30. The mobile station of claim 25, wherein the type of call processing comprises correlating a received emergency number in a first standard to an emergency call processing routine in a second standard.

31. The mobile station of claim 25, wherein the at least one carrier-designated special phone book entry comprises a modem pool number and the type of call processing comprises a routine that establishes a connection using an analog modulation technique.

32. The mobile station of claim 25, wherein the at least one carrier-designated special phone book entry comprises a network operator number and the type of call processing comprises a routine that overrides a locking mechanism and calls a network operator.

33. A non-transitory processor-readable storage medium having stored thereon processor-executable instructions configured to cause a mobile station processor to perform operations comprising:
creating, in a memory of the mobile station, an electronic phone book comprising at least one carrier-designated special phone book entry and a subscriber-designated phone book entry, each carrier-designated special phone book entry comprising a number field and a type field specifying a type of call processing to apply to any incoming or outgoing call corresponding to the carrier-designated special phone book entry, the subscriber-designated phone book entry comprising a number field and an information field;

receiving a request to process either an incoming telephone call or an outgoing telephone call, the incoming or outgoing telephone call having a telephone number associated with the received request and identifying a second station;

determining if the telephone number associated with the received request corresponds to numbers stored in the number field of at least one carrier-designated special phone book entry;

processing the received request, based on determining that the telephone number associated with the received request corresponds to numbers stored in at least one number field of the carrier-designated special phone book entry, by substituting a standard telephone call processing routine used for processing telephone numbers associated with subscriber-designated phone book entries with a special telephone call processing routine selected from a plurality of special telephone call processing routines based on the type field associated with the carrier-designated special phone book entry, wherein:

each carrier-designated special phone book entry is programmed into the electronic phone book based on parameters associated with a received call that correspond to a type of call processing associated with a carrier-designated special phone book entry, and each carrier-designated special phone book entry is stored in the electronic phone book such that it is not accessible to a subscriber, and such that the subscriber does not have the capability to enter, remove or modify any of the carrier-designated special phone book entries.

34. The non-transitory processor-readable storage medium of claim 33, wherein the stored processor-executable instructions are configured to cause the mobile phone processor to perform operations further comprising:

receiving an input to lock a locking mechanism on the mobile station, wherein the locking mechanism is operable to lock or unlock access to the mobile station;

receiving a new call corresponding to the at least one carrier-designated special phone book entry and having the type of call processing comprising automatically unlocking the mobile station; and unlocking the locking mechanism based on receiving the new call.

35. The non-transitory processor-readable storage medium of claim 33, wherein the stored processor-executable instructions are configured to cause the mobile phone processor to perform operations such that the call is an incoming over-the-air service provisioning call.

36. The non-transitory processor-readable storage medium of claim 33, wherein the stored processor-executable instructions are configured to cause the mobile phone processor to perform operations such that the call is an outgoing over-the-air service provisioning call.

37. The non-transitory processor-readable storage medium of claim 33, wherein the stored processor-executable instructions are configured to cause the mobile phone processor to perform operations such that a new carrier-designated special phone book entry is stored during over-the-air service provisioning.

38. The non-transitory processor-readable storage medium of claim 33, wherein the stored processor-executable instructions are configured to cause the mobile phone processor to perform operations such that the processing further comprises correlating a received emergency number in a first standard to an emergency call processing routine in a second standard.

39. The non-transitory processor-readable storage medium of claim 33, wherein the stored processor-executable instructions are configured to cause the mobile phone processor to perform operations such that at least one carrier-designated special phone book entry comprises a modem pool number and the type of call processing comprises a routine that establishes a connection using an analog modulation technique.

40. The non-transitory processor-readable storage medium of claim 33, wherein the stored processor-executable instructions are configured to cause the mobile phone processor to perform operations such that at least one carrier-designated special phone book entry comprises a network operator number and the type of call processing comprises a routine that overrides a locking mechanism and calls a network operator.

* * * * *